United States Patent
Li et al.

(10) Patent No.: US 9,904,097 B2
(45) Date of Patent: Feb. 27, 2018

(54) METHOD FOR MANUFACTURING QUANTUM DOT COLOR FILTER SUBSTRATE

(71) Applicant: Shenzhen China Star Optoelectronics Technology Co., Ltd., Shenzhen (CN)

(72) Inventors: Lanyan Li, Shenzhen (CN); Yuheng Liang, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 257 days.

(21) Appl. No.: 14/914,638

(22) PCT Filed: Dec. 23, 2015

(86) PCT No.: PCT/CN2015/098351
§ 371 (c)(1),
(2) Date: Feb. 26, 2016

(87) PCT Pub. No.: WO2017/092090
PCT Pub. Date: Jun. 8, 2017

(65) Prior Publication Data
US 2018/0031910 A1    Feb. 1, 2018

(30) Foreign Application Priority Data
Dec. 2, 2015   (CN) .......................... 2015 1 0872309

(51) Int. Cl.
*H01J 9/00*    (2006.01)
*H01J 9/24*    (2006.01)
(Continued)

(52) U.S. Cl.
CPC ....... *G02F 1/133516* (2013.01); *B05D 1/005* (2013.01); *G02F 1/1368* (2013.01);
(Continued)

(58) Field of Classification Search
CPC ............. G02F 1/133516; G02F 1/1368; G02F 1/133617; G02F 1/133512; G02F 1/13394;
(Continued)

(56) References Cited

U.S. PATENT DOCUMENTS

2009/0314991 A1    12/2009  Cho et al.
2012/0052438 A1*    3/2012  Kim .................... G03F 7/022
                                                                    430/270.1
(Continued)

FOREIGN PATENT DOCUMENTS

CN    101055368 A    10/2007
CN    102636904 A    8/2012
KR    20070002421 A   1/2007

*Primary Examiner* — Donald Raleigh
(74) *Attorney, Agent, or Firm* — Leong C. Lei (57) ABSTRACT

The present invention provides a method for manufacturing a quantum dot color filter substrate, in which a black photoresist layer and a transparent photoresist layer are first coated and formed on a backing plate in sequence and then, first, second, and third patterns of a photo mask having different grey levels are used to pattern the black photoresist layer and the transparent photoresist layer to obtain a plurality of transparent barrier walls corresponding to the first pattern, sub spacers corresponding to the second pattern and located on the transparent barrier walls, and main spacers corresponding to the third pattern and located on the transparent barrier walls and also to obtain a plurality of black barrier walls covered by the plurality of transparent barrier walls, the plurality of black barrier walls and the plurality of transparent barrier walls located thereon collectively defining a plurality of pixel barrier walls; and then, patterned quantum dot layers are formed in sub-pixel zones that are delimited and surrounded by the plurality of pixel barrier walls by means of inkjet printing such that accuracy of inkjet printing is greatly improved.

17 Claims, 4 Drawing Sheets

(51) Int. Cl.
*G02F 1/1335* (2006.01)
*G02F 1/1339* (2006.01)
*B05D 1/00* (2006.01)
*G02F 1/1368* (2006.01)

(52) U.S. Cl.
CPC .... *G02F 1/13394* (2013.01); *G02F 1/133512* (2013.01); *G02F 1/133528* (2013.01); *G02F 1/133617* (2013.01); *G02F 2001/13396* (2013.01); *G02F 2001/133614* (2013.01); *G02F 2202/36* (2013.01)

(58) Field of Classification Search
CPC ... G02F 1/133528; G02F 2001/133614; G02F 2001/13396; G02F 2202/36; B05D 1/005
See application file for complete search history.

(56) References Cited

U.S. PATENT DOCUMENTS

2013/0242247 A1* 9/2013 Lee ................... G02F 1/13439
349/138
2016/0004135 A1* 1/2016 Nakao ................ G02F 1/13394
349/42

* cited by examiner

METHOD FOR MANUFACTURING QUANTUM DOT COLOR FILTER SUBSTRATE

BACKGROUND OF THE INVENTION

1. Field of the Invention

The present invention relates to the field of display technology, and in particular to a method for manufacturing a quantum dot color filter substrate.

2. The Related Arts

Due to various advantages, such as high colorfulness, compactness, and low power consumption, thin-film transistor liquid crystal displays (TFT-LCDs) are now taking a leading position in the field of flat panel displays. A color filter, which is one of the important components of a liquid crystal display, generally achieves color displaying by means of color resist layers of red (R), green (G), and blue (B).

With the continuous development of the display technology, people increasingly demand higher and higher quality of displaying. Quantum dots (QDs) are semiconductor particles having a particle size of 1-100 nm. Since the particle size of QDs is relatively small, less than or close to the exciton Bohr radius of the corresponding body material, an quantum confinement effect is generally involved, where the continuous energy band structure of the body material is changed to a discrete structure of energy levels, so that, when excited by external light, electron transition occurs and fluorescence is emitted.

Such a unique discrete energy level structure of the QDs makes the full width at half maximum thereof relatively narrow so that monochromatic light with high purity may be emitted and, compared to a conventional display, a high light emission efficiency may be obtained. Further, since the energy band gaps of the QDs are greatly affected by the sizes thereof, it is possible to generate different wavelengths of light by adjusting the size of the QDs or using different ingredients of QDs. Substituting the traditional color resists in a color filter substrate with QDs would greatly increase the color gamut and transmission rate of a TFT-LCD, bringing a better effect of displaying.

Heretofore, the color resist layers of R, G, B of a TFT-LCD are generally formed of photoresists of different colors that are shaped through exposure and development of photolithography. The photoresist contains therein a photo initiator, which is an active group. When QDs are dispersed in the photoresist, due to the QDs being nanometer particles, they may very easily react with the initiator so as to abruptly lower down light emission efficiency or even get quenching thereby affecting the performance of the QDs. Thus, development of photoresist materials having high light emission efficiencies is difficult. Further, the development process of photolithography may remove unnecessary portions through development so as to lead to a great waste of the quantum dot material.

Inkjet printing allows QD ink that contains therein QDs to be directly printed at a designated site and theoretically, no waste of material may incur. However, the QD ink may be printed as circular print dots during the printing process. In order to have the QD ink deposited at a designated site and forming a desired shape of a sub-pixel, it is commonplace to provide an arrangement of barrier walls first and then the QD ink is printed in cavities formed by the barrier walls.

SUMMARY OF THE INVENTION

An object of the present invention is to provide a method for manufacturing a quantum dot color filter substrate, which uses a grey level patterns formed on a photo mask to form, through one process of exposure and development, pixel barrier walls, main spacers, and sub spacers, and then forms patterned quantum dot layers in zones delimited and surrounded by the pixel barrier walls through inkjet printing and which has a simple operation, takes a short period of time, has a reduced expenditure of facility installation, and shows high utilization of quantum dot materials.

To achieve the above object, the present invention provides a method for manufacturing a quantum dot color filter substrate, which comprises the following steps:

(1) providing a backing plate, coating and forming a black photoresist layer on the backing plate, and subjecting the black photoresist layer to vacuum drying and pre-baking in order to remove a portion of solvent contained in the black photoresist layer;

(2) coating and forming a transparent photoresist layer on the black photoresist layer;

(3) providing a photo mask, wherein the photo mask comprises a plurality of first, second, and third patterns having different grey levels, and subjecting the transparent photoresist layer to exposure with ultraviolet light through the photo mask;

(4) subjecting the black photoresist layer and the transparent photoresist layer to development to obtain a plurality of transparent barrier walls that belongs to the transparent photoresist layer and corresponds to the first pattern, a plurality of sub spacers that corresponds to the second pattern and is located on the transparent barrier walls, and a plurality of main spacers that corresponds to the third pattern and is located on the transparent barrier walls and also to obtain a plurality of black barrier walls that belongs to the black photoresist layer and is covered by the plurality of transparent barrier walls, wherein the main spacers have a height that is greater than a height of the sub spacers; and the plurality of black barrier walls and the plurality of transparent barrier walls located thereon collectively define a plurality of pixel barrier walls, which delimits and surrounds a plurality of red sub-pixel zones, a plurality of green sub-pixel zones, and a plurality of blue sub-pixel zones on the backing plate;

(5) subjecting the black barrier walls, the transparent barrier walls, the sub spacers, and the main spacers to baking in order to remove a major portion of solvent contained therein and improve curing degree and attaching capability; and (6) forming patterned red, green, and blue quantum dot layers on the backing plate at locations respectively corresponding to the red, green, and blue sub-pixel zones through inkjet printing process.

In step (1), the black photoresist layer is formed by means of slit coating or spin coating and the black photoresist layer has a thickness of 0.5-2 µm.

In step (2), the transparent photoresist layer is formed by means of slit coating or spin coating and the transparent photoresist layer has a thickness of 0.5-5 µm.

A material that makes the transparent photoresist layer and a photoresist component that makes the black photoresist layer are positive photoresist and the first, second, and third patterns of the photo mask have light transmission rates that are reduced stepwisely.

A material that makes the transparent photoresist layer and a photoresist component that makes the black photoresist layer are negative photoresist and the third, second, and first patterns of the photo mask have light transmission rates that are reduced stepwisely.

The backing plate provided in step (1) is a thin-film transistor (TFT) array substrate and the backing plate is provided thereon with a TFT array.

A quantum dot color filter substrate obtained with step (6) is applicable to a liquid crystal display;

the liquid crystal display comprises a liquid crystal display panel and a backlight module located under the liquid crystal display panel; the liquid crystal display panel comprises an upper substrate, a lower substrate located under the upper substrate, a liquid crystal layer located between the upper and lower substrates, an upper polarizer, and a lower polarizer;

the quantum dot color filter substrate serves as the lower substrate of the liquid crystal display panel and the lower polarizer is arranged on a surface of the lower substrate that is adjacent to the liquid crystal layer.

A quantum dot color filter substrate obtained with step (6) is applicable to a liquid crystal display;

the liquid crystal display comprises a liquid crystal display panel and a backlight module located under the liquid crystal display panel; the liquid crystal display panel comprises an upper substrate, a lower substrate located under the upper substrate, a liquid crystal layer located between the upper and lower substrates, an upper polarizer, and a lower polarizer;

the lower substrate is a thin-film transistor (TFT) array substrate, the quantum dot color filter substrate serving as an upper substrate of the liquid crystal display panel, the upper polarizer being arranged on a surface of the upper substrate that is adjacent to the liquid crystal layer.

The lower polarizer is arranged on a surface of the lower substrate that is distant from the liquid crystal layer.

In step (6), the red, green, and blue quantum dot layers are each formed of quantum dot ink containing red quantum dots, green quantum dots, and blue quantum dots respectively.

The present invention also provides a method for manufacturing a quantum dot color filter substrate, which comprises the following steps:

(1) providing a backing plate, coating and forming a black photoresist layer on the backing plate, and subjecting the black photoresist layer to vacuum drying and pre-baking in order to remove a portion of solvent contained in the black photoresist layer;

(2) coating and forming a transparent photoresist layer on the black photoresist layer;

(3) providing a photo mask, wherein the photo mask comprises a plurality of first, second, and third patterns having different grey levels, and subjecting the transparent photoresist layer to exposure with ultraviolet light through the photo mask;

(4) subjecting the black photoresist layer and the transparent photoresist layer to development to obtain a plurality of transparent barrier walls that belongs to the transparent photoresist layer and corresponds to the first pattern, a plurality of sub spacers that corresponds to the second pattern and is located on the transparent barrier walls, and a plurality of main spacers that corresponds to the third pattern and is located on the transparent barrier walls and also to obtain a plurality of black barrier walls that belongs to the black photoresist layer and is covered by the plurality of transparent barrier walls, wherein the main spacers have a height that is greater than a height of the sub spacers; and the plurality of black barrier walls and the plurality of transparent barrier walls located thereon collectively define a plurality of pixel barrier walls, which delimits and surrounds a plurality of red sub-pixel zones, a plurality of green sub-pixel zones, and a plurality of blue sub-pixel zones on the backing plate;

(5) subjecting the black barrier walls, the transparent barrier walls, the sub spacers, and the main spacers to baking in order to remove a major portion of solvent contained therein and improve curing degree and attaching capability; and (6) forming patterned red, green, and blue quantum dot layers on the backing plate at locations respectively corresponding to the red, green, and blue sub-pixel zones through inkjet printing process;

wherein in step (1), the black photoresist layer is formed by means of slit coating or spin coating and the black photoresist layer has a thickness of 0.5-2 µm;

wherein in step (2), the transparent photoresist layer is formed by means of slit coating or spin coating and the transparent photoresist layer has a thickness of 0.5-5 µm; and wherein in step (6), the red, green, and blue quantum dot layers are each formed of quantum dot ink containing red quantum dots, green quantum dots, and blue quantum dots respectively.

A beneficial effect of the present invention is that the present invention provides a method for manufacturing a quantum dot color filter substrate, in which a black photoresist layer and a transparent photoresist layer are first coated and formed on a backing plate in sequence and then, first, second, and third patterns of a photo mask having different grey levels are used to pattern the black photoresist layer and the transparent photoresist layer to obtain a plurality of transparent barrier walls corresponding to the first pattern, sub spacers corresponding to the second pattern and located on the transparent barrier walls, and main spacers corresponding to the third pattern and located on the transparent barrier walls and also to obtain a plurality of black barrier walls covered by the plurality of transparent barrier walls, the plurality of black barrier walls and the plurality of transparent barrier walls located thereon collectively defining a plurality of pixel barrier walls; and then, patterned quantum dot layers are formed in sub-pixel zones that are delimited and surrounded by the plurality of pixel barrier walls by means of inkjet printing such that accuracy of inkjet printing is greatly improved. The method for manufacturing a quantum dot color filter substrate has a simple operation, takes a short period of time, has a reduced expenditure of facility installation, and shows high utilization of quantum dot materials.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will become apparent from the following detailed description of an embodiment of the present invention, with reference to the attached drawings.

In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
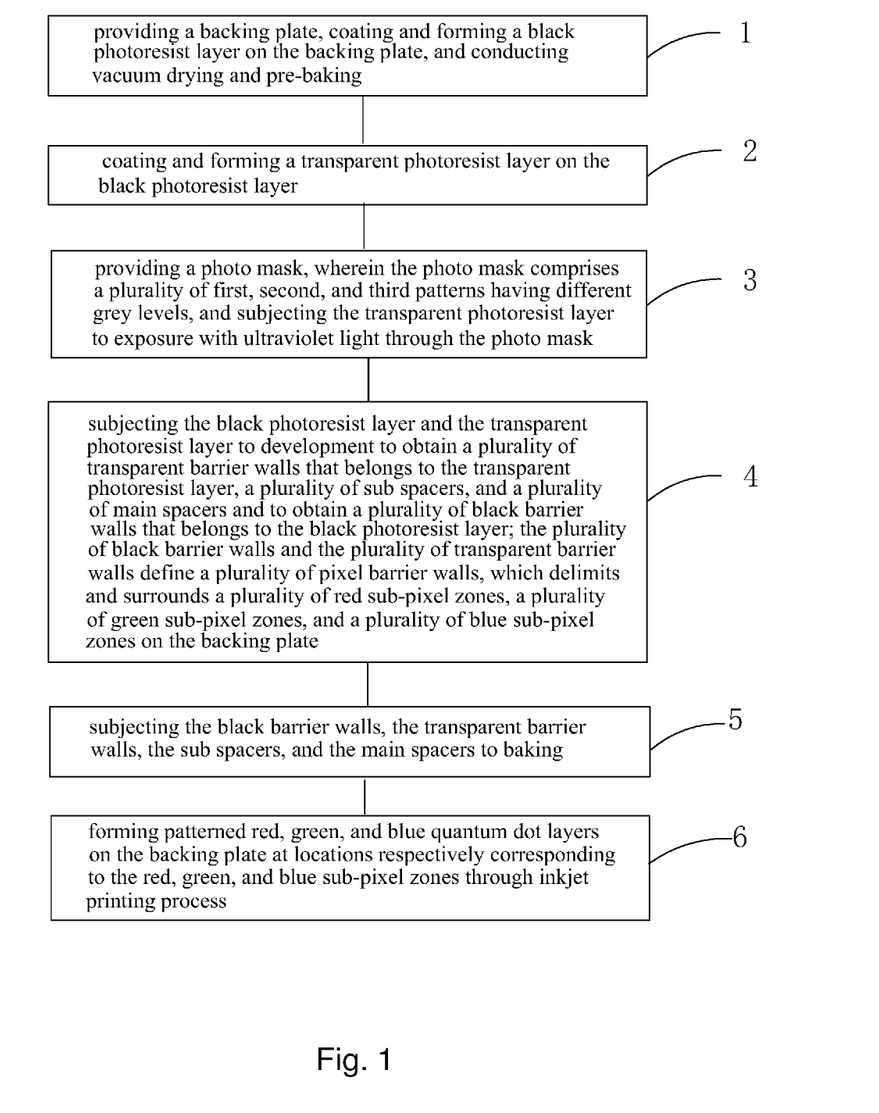
FIG. 1 is a flow chart illustrating a method for manufacturing a quantum dot color filter substrate according to the present invention.
Figure 2:
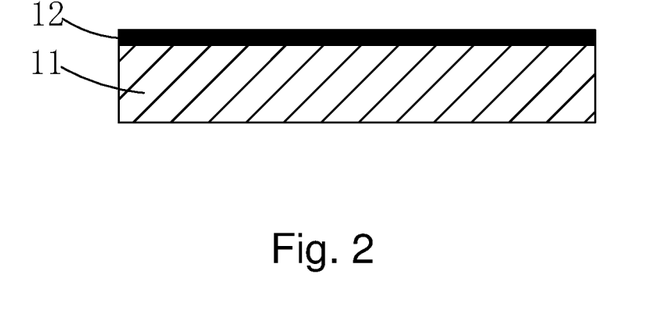
FIG. 2 is a schematic view illustrating step 1 of the method for manufacturing a quantum dot color filter substrate according to the present invention.

Referring to FIG. 1, firstly, the present invention provides a method for manufacturing a quantum dot color filter substrate, which comprises the following steps:

Step 1: as shown in FIG. 2, providing a backing plate 11, coating and forming a black photoresist layer 12 on the backing plate 11, and subjecting the black photoresist layer 12 to vacuum drying and pre-baking in order to remove a portion of solvent contained in the black photoresist layer 12.

Specifically, the black photoresist layer 12 is formed by means of slit coating or spin coating and the black photoresist layer 12 has a thickness of 0.5-2 μm.

Figure 3:
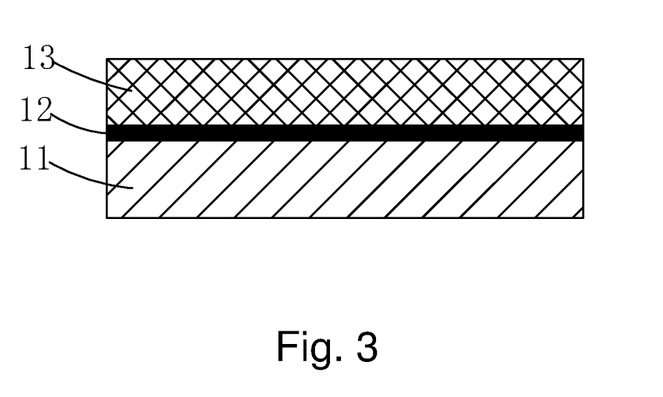
FIG. 3 is a schematic view illustrating step 2 of the method for manufacturing a quantum dot color filter substrate according to the present invention.

Step 2: as shown in FIG. 3, coating and forming a transparent photoresist layer 13 on the black photoresist layer 12.

Specifically, the transparent photoresist layer 13 is formed by means of slit coating or spin coating and the transparent photoresist layer 13 has a thickness of 0.5-5 μm.

Figure 4:
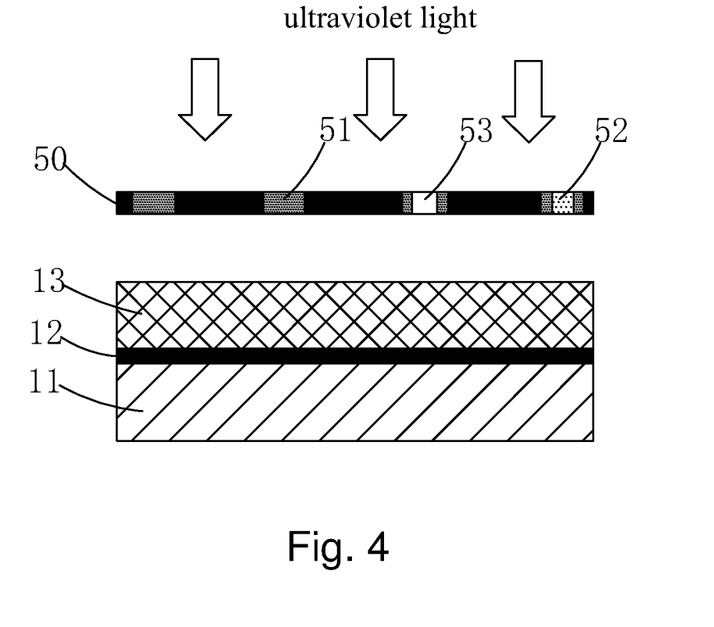
FIG. 4 is a schematic view illustrating step 3 of the method for manufacturing a quantum dot color filter substrate according to the present invention.

Step 3: as shown in FIG. 4, providing a photo mask 50, wherein the photo mask 50 comprises a plurality of first, second, and third patterns 51, 52, 53 having different grey levels, and subjecting the transparent photoresist layer 13 to exposure with ultraviolet light through the photo mask 50 so as to cause photoreactions in the transparent photoresist layer 13 through the light irradiation, wherein the photoreaction in a portion corresponding to one of the patterns of the photo mask 50 that has a lowest level of light transmission rate is of the lowest level; the photoreaction in a portion corresponding to one of the patterns of the photo mask 50 that has an intermediate level of light transmission rate is of an intermediate level; and the photoreaction in a portion corresponding to one of the patterns of the photo mask 50 that has a highest level of light transmission rate is of the highest level.

Specifically, if a material that makes the transparent photoresist layer 13 and a photoresist component that makes the black photoresist layer 12 are positive photoresist, the light transmission rates of the first, second, and third patterns 51, 52, 53 of the photo mask 50 are reduced stepwisely.

Specifically, if a material that makes the transparent photoresist layer 13 and a photoresist component that makes the black photoresist layer 12 are negative photoresist, the light transmission rates of the third, second, and first patterns 53, 52, 51 of the photo mask 50 are reduced stepwisely.

Figure 5:
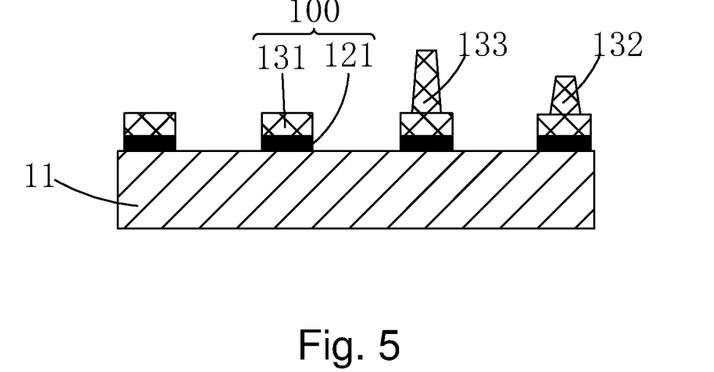
FIG. 5 is a schematic view illustrating step 4 of the method for manufacturing a quantum dot color filter substrate according to the present invention.

Step 4: as shown in FIG. 5, subjecting the black photoresist layer 12 and the transparent photoresist layer 13 to development to obtain a plurality of transparent barrier walls 131 that belongs to the transparent photoresist layer 13 and corresponds to the first pattern 51, a plurality of sub spacers 132 that corresponds to the second pattern 52 and is located on the transparent barrier walls 131, and a plurality of main spacers 133 that corresponds to the third pattern 53 and is located on the transparent barrier walls 131 and also to obtain a plurality of black barrier walls 121 that belongs to the black photoresist layer 12 and is covered by the plurality of transparent barrier walls 131.

The main spacers 133 have a height that is greater than a height of the sub spacers 132.

The plurality of black barrier walls 121 and the plurality of transparent barrier walls 131 located thereon collectively define a plurality of pixel barrier walls 100, which delimits and surrounds a plurality of red sub-pixel zones, a plurality of green sub-pixel zones, and a plurality of blue sub-pixel zones on the backing plate 11.

Specifically, the plurality of black barrier walls 121 forms a black matrix and is located along edges of each of the sub-pixel zones to prevent light leakage. For purposes of optical performance, the black matrix should not be made excessively thick and thus, the height of the black barrier walls 121 does not reach a barrier wall height desired for inkjet printing and does not provide a desired function of a barrier. However, the height of the plurality of black barrier walls 121 plus the height of the plurality of transparent barrier walls 131 located thereon is sufficient to suit the need of a subsequent operation of inkjet printing thereby achieving the function of a barrier.

Specifically, the arrangement of the sub spacers 132 and the main spacers 133 is for maintaining a cell thickness of a liquid crystal display panel and supporting upper and lower substrates. Specifically, the main spacers 133 and the sub spacers 132 are arranged to provide a height difference therebetween for the purposes of increasing the capability of resisting finger pressure and increasing margin of liquid crystal.

In the method for manufacturing a quantum dot color filter substrate according to the present invention, the black barrier walls 121, the transparent barrier walls 131, the sub spacers 132, and the main spacers 133 are formed through two coating operations and one exposure and development process. Compared to a known process, at least two processes of exposure and development are saved so that the manufacturing efficiency is increased and the manufacturing cost is reduced.

Step 5: subjecting the black barrier walls 121, the transparent barrier walls 131, the sub spacers 132, and the main spacers 133 to baking in order to remove a major portion of solvent contained therein and improve curing degree and attaching capability.

Figure 6:
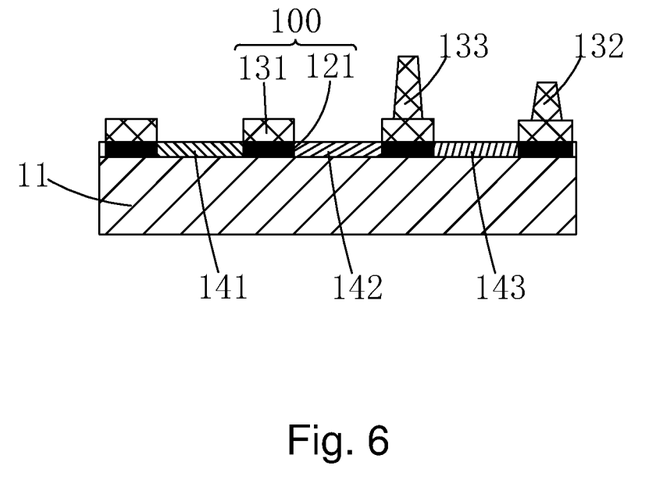
FIG. 6 is a schematic view illustrating step 6 of the method for manufacturing a quantum dot color filter substrate according to the present invention.

Step 6: as shown in FIG. 6, forming patterned red, green, and blue quantum dot layers 141, 142, 143 on the backing plate 11 at locations respectively corresponding to the red, green, and blue sub-pixel zones through inkjet printing process.

Specifically, in this step, the plurality of pixel barrier walls 100 that is formed of the plurality of black barrier walls 121 and the plurality of transparent barrier walls 131 located thereon greatly improves accuracy of inkjet printing. Further, the red, green, and blue quantum dot layers 141, 142, 143 are each formed of quantum dot ink containing red quantum dots, green quantum dots, and blue quantum dots respectively. The quantum dot ink does not contain therein active groups so that the potential risk of abruptly lowering light emission efficiency and even getting quenched can be reduced for the quantum dots.

Specifically, the backing plate 11 provided in step 1 can be a thin-film transistor (TFT) array substrate and the backing plate 11 is provided thereon with a TFT array; and thus, a quantum dot color filter substrate that can be formed after step 6 is of a COA (Color Filter on Array) structure. The quantum dot color filter substrate is applicable to a liquid crystal display to serve as a lower substrate of a liquid crystal display panel. Specifically, the liquid crystal display comprises the liquid crystal display panel and a backlight module located under the liquid crystal display panel; the liquid crystal display panel comprises an upper substrate, a lower substrate that is located under the upper substrate, a liquid crystal layer between the upper and lower substrates, an upper polarizer, and a lower polarizer; and the quantum dot color filter substrate serves as the lower substrate of the liquid crystal display panel, the lower polarizer being arranged on a surface of the lower substrate that is adjacent to the liquid crystal layer. In other words, backlighting emitting from the backlight module transmits through the TFT array, the quantum dot layers 141/142/143, the lower polarizer, the liquid crystal layer, and the upper polarizer to emit out.

Specifically, the backing plate 11 provided in step 1 can be a non-TFT array substrate, and thus, the quantum dot color filter substrate obtained after step 6 can be of a non-COA structure. The quantum dot color filter substrate is applicable to a liquid crystal display to serve as an upper substrate of a liquid crystal display panel. Specifically, the liquid crystal display comprises the liquid crystal display panel and a backlight module located under the liquid crystal display panel; the liquid crystal display panel comprises an upper substrate, a lower substrate that is located under the upper substrate, a liquid crystal layer between the upper and lower substrates, an upper polarizer, and a lower polarizer; and the lower substrate is a TFT array substrate, the quantum dot color filter substrate serving as the upper substrate of the liquid crystal display panel, the upper polarizer being arranged on a surface of the upper substrate that is adjacent to the liquid crystal layer; the lower polarizer is arranged on a surface of the lower substrate that is distant from the liquid crystal layer. In other words, backlighting emitting from the backlight module transmits through the lower polarizer, the TFT array, the liquid crystal layer, the upper polarizer, and the quantum dot layers 141/142/143 to emit out.

In summary, the present invention provides a method for manufacturing a quantum dot color filter substrate, in which a black photoresist layer and a transparent photoresist layer are first coated and formed on a backing plate in sequence and then, first, second, and third patterns of a photo mask having different grey levels are used to pattern the black photoresist layer and the transparent photoresist layer to obtain a plurality of transparent barrier walls corresponding to the first pattern, sub spacers corresponding to the second pattern and located on the transparent barrier walls, and main spacers corresponding to the third pattern and located on the transparent barrier walls and also to obtain a plurality of black barrier walls covered by the plurality of transparent barrier walls, the plurality of black barrier walls and the plurality of transparent barrier walls located thereon collectively defining a plurality of pixel barrier walls; and then, patterned quantum dot layers are formed in sub-pixel zones that are delimited and surrounded by the plurality of pixel barrier walls by means of inkjet printing such that accuracy of inkjet printing is greatly improved. The method for manufacturing a quantum dot color filter substrate has a simple operation, takes a short period of time, has a reduced expenditure of facility installation, and shows high utilization of quantum dot materials.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for manufacturing a quantum dot color filter substrate, comprising the following steps:
    (1) providing a backing plate, coating and forming a black photoresist layer on the backing plate, and subjecting the black photoresist layer to vacuum drying and pre-baking in order to remove a portion of solvent contained in the black photoresist layer;
    (2) coating and forming a transparent photoresist layer on the black photoresist layer;
    (3) providing a photo mask, wherein the photo mask comprises a plurality of first, second, and third patterns having different grey levels, and subjecting the transparent photoresist layer to exposure with ultraviolet light through the photo mask;
    (4) subjecting the black photoresist layer and the transparent photoresist layer to development to obtain a plurality of transparent barrier walls that belongs to the transparent photoresist layer and corresponds to the first pattern, a plurality of sub spacers that corresponds to the second pattern and is located on the transparent barrier walls, and a plurality of main spacers that corresponds to the third pattern and is located on the transparent barrier walls and also to obtain a plurality of black barrier walls that belongs to the black photoresist layer and is covered by the plurality of transparent barrier walls,
    wherein the main spacers have a height that is greater than a height of the sub spacers; and
    the plurality of black barrier walls and the plurality of transparent barrier walls located thereon collectively define a plurality of pixel barrier walls, which delimits and surrounds a plurality of red sub-pixel zones, a plurality of green sub-pixel zones, and a plurality of blue sub-pixel zones on the backing plate;
    (5) subjecting the black barrier walls, the transparent barrier walls, the sub spacers, and the main spacers to baking in order to remove a major portion of solvent contained therein and improve curing degree and attaching capability; and
    (6) forming patterned red, green, and blue quantum dot layers on the backing plate at locations respectively corresponding to the red, green, and blue sub-pixel zones through inkjet printing process.

2. The method for manufacturing a quantum dot color filter substrate as claimed in claim 1, wherein in step (1), the black photoresist layer is formed by means of slit coating or spin coating and the black photoresist layer has a thickness of 0.5-2 μm.

3. The method for manufacturing a quantum dot color filter substrate as claimed in claim 1, wherein in step (2), the transparent photoresist layer is formed by means of slit coating or spin coating and the transparent photoresist layer has a thickness of 0.5-5 μm.

4. The method for manufacturing a quantum dot color filter substrate as claimed in claim 1, wherein a material that makes the transparent photoresist layer and a photoresist component that makes the black photoresist layer are positive photoresist and the first, second, and third patterns of the photo mask have light transmission rates that are reduced stepwisely.

5. The method for manufacturing a quantum dot color filter substrate as claimed in claim 1, wherein a material that makes the transparent photoresist layer and a photoresist component that makes the black photoresist layer are negative photoresist and the third, second, and first patterns of the photo mask have light transmission rates that are reduced stepwisely.

6. The method for manufacturing a quantum dot color filter substrate as claimed in claim 1, wherein the backing plate provided in step (1) is a thin-film transistor (TFT) array substrate and the backing plate is provided thereon with a TFT array.

7. The method for manufacturing a quantum dot color filter substrate as claimed in claim 6, wherein a quantum dot color filter substrate obtained with step (6) is applicable to a liquid crystal display;
the liquid crystal display comprises a liquid crystal display panel and a backlight module located under the liquid crystal display panel; the liquid crystal display panel comprises an upper substrate, a lower substrate located under the upper substrate, a liquid crystal layer located between the upper and lower substrates, an upper polarizer, and a lower polarizer;
the quantum dot color filter substrate serves as the lower substrate of the liquid crystal display panel and the lower polarizer is arranged on a surface of the lower substrate that is adjacent to the liquid crystal layer.

8. The method for manufacturing a quantum dot color filter substrate as claimed in claim 1, wherein a quantum dot color filter substrate obtained with step (6) is applicable to a liquid crystal display;
the liquid crystal display comprises a liquid crystal display panel and a backlight module located under the liquid crystal display panel; the liquid crystal display panel comprises an upper substrate, a lower substrate located under the upper substrate, a liquid crystal layer located between the upper and lower substrates, an upper polarizer, and a lower polarizer;
the lower substrate is a thin-film transistor (TFT) array substrate, the quantum dot color filter substrate serving as an upper substrate of the liquid crystal display panel, the upper polarizer being arranged on a surface of the upper substrate that is adjacent to the liquid crystal layer.

9. The method for manufacturing a quantum dot color filter substrate as claimed in claim 8, wherein the lower polarizer is arranged on a surface of the lower substrate that is distant from the liquid crystal layer.

10. The method for manufacturing a quantum dot color filter substrate as claimed in claim 1, wherein in step (6), the red, green, and blue quantum dot layers are each formed of quantum dot ink containing red quantum dots, green quantum dots, and blue quantum dots respectively.

11. A method for manufacturing a quantum dot color filter substrate, comprising the following steps:

(1) providing a backing plate, coating and forming a black photoresist layer on the backing plate, and subjecting the black photoresist layer to vacuum drying and pre-baking in order to remove a portion of solvent contained in the black photoresist layer;

(2) coating and forming a transparent photoresist layer on the black photoresist layer;

(3) providing a photo mask, wherein the photo mask comprises a plurality of first, second, and third patterns having different grey levels, and subjecting the transparent photoresist layer to exposure with ultraviolet light through the photo mask;

(4) subjecting the black photoresist layer and the transparent photoresist layer to development to obtain a plurality of transparent barrier walls that belongs to the transparent photoresist layer and corresponds to the first pattern, a plurality of sub spacers that corresponds to the second pattern and is located on the transparent barrier walls, and a plurality of main spacers that corresponds to the third pattern and is located on the transparent barrier walls and also to obtain a plurality of black barrier walls that belongs to the black photoresist layer and is covered by the plurality of transparent barrier walls,
wherein the main spacers have a height that is greater than a height of the sub spacers; and
the plurality of black barrier walls and the plurality of transparent barrier walls located thereon collectively define a plurality of pixel barrier walls, which delimits and surrounds a plurality of red sub-pixel zones, a plurality of green sub-pixel zones, and a plurality of blue sub-pixel zones on the backing plate;

(5) subjecting the black barrier walls, the transparent barrier walls, the sub spacers, and the main spacers to baking in order to remove a major portion of solvent contained therein and improve curing degree and attaching capability; and (6) forming patterned red, green, and blue quantum dot layers on the backing plate at locations respectively corresponding to the red, green, and blue sub-pixel zones through inkjet printing process;

wherein in step (1), the black photoresist layer is formed by means of slit coating or spin coating and the black photoresist layer has a thickness of 0.5-2 μm;

wherein in step (2), the transparent photoresist layer is formed by means of slit coating or spin coating and the transparent photoresist layer has a thickness of 0.5-5 μm; and wherein in step (6), the red, green, and blue quantum dot layers are each formed of quantum dot ink containing red quantum dots, green quantum dots, and blue quantum dots respectively.

12. The method for manufacturing a quantum dot color filter substrate as claimed in claim 11, wherein a material that makes the transparent photoresist layer and a photoresist component that makes the black photoresist layer are positive photoresist and the first, second, and third patterns of the photo mask have light transmission rates that are reduced stepwisely.

13. The method for manufacturing a quantum dot color filter substrate as claimed in claim 11, wherein a material that makes the transparent photoresist layer and a photoresist component that makes the black photoresist layer are negative photoresist and the third, second, and first patterns of the photo mask have light transmission rates that are reduced stepwisely.

14. The method for manufacturing a quantum dot color filter substrate as claimed in claim 11, wherein the backing plate provided in step (1) is a thin-film transistor (TFT) array substrate and the backing plate is provided thereon with a TFT array.

15. The method for manufacturing a quantum dot color filter substrate as claimed in claim 14, wherein a quantum dot color filter substrate obtained with step (6) is applicable to a liquid crystal display;

the liquid crystal display comprises a liquid crystal display panel and a backlight module located under the liquid crystal display panel; the liquid crystal display panel comprises an upper substrate, a lower substrate located under the upper substrate, a liquid crystal layer located between the upper and lower substrates, an upper polarizer, and a lower polarizer;

the quantum dot color filter substrate serves as the lower substrate of the liquid crystal display panel and the lower polarizer is arranged on a surface of the lower substrate that is adjacent to the liquid crystal layer.

16. The method for manufacturing a quantum dot color filter substrate as claimed in claim 11, wherein a quantum dot color filter substrate obtained with step (6) is applicable to a liquid crystal display;

the liquid crystal display comprises a liquid crystal display panel and a backlight module located under the liquid crystal display panel; the liquid crystal display panel comprises an upper substrate, a lower substrate located under the upper substrate, a liquid crystal layer located between the upper and lower substrates, an upper polarizer, and a lower polarizer;

the lower substrate is a thin-film transistor (TFT) array substrate, the quantum dot color filter substrate serving as an upper substrate of the liquid crystal display panel, the upper polarizer being arranged on a surface of the upper substrate that is adjacent to the liquid crystal layer.

17. The method for manufacturing a quantum dot color filter substrate as claimed in claim 16, wherein the lower polarizer is arranged on a surface of the lower substrate that is distant from the liquid crystal layer.

* * * * *